(12) United States Patent
Zhao et al.

(10) Patent No.: US 8,165,209 B2
(45) Date of Patent: Apr. 24, 2012

(54) METHOD AND APPARATUS FOR PROVIDING A FAST MOTION ESTIMATION PROCESS

(75) Inventors: Yinqing Zhao, San Diego, CA (US); Krit Panusopone, San Diego, CA (US); Limin Wang, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 1221 days.

(21) Appl. No.: 11/859,813

(22) Filed: Sep. 24, 2007

(65) Prior Publication Data

US 2009/0080527 A1 Mar. 26, 2009

(51) Int. Cl.
*H04B 1/66* (2006.01)
*H04N 7/12* (2006.01)
*H04N 11/02* (2006.01)
*H04N 11/04* (2006.01)

(52) U.S. Cl. .................................... 375/240.16; 382/236
(58) Field of Classification Search .................. None
See application file for complete search history.

(56) References Cited

U.S. PATENT DOCUMENTS

| 7,760,953 | B2* | 7/2010 | Takei ............................. 382/236 |
| 2005/0013367 | A1* | 1/2005 | Gallant et al. ............ 375/240.16 |
| 2005/0013368 | A1* | 1/2005 | Gallant et al. ............ 375/240.16 |
| 2005/0286777 | A1* | 12/2005 | Kumar et al. ................. 382/232 |
| 2006/0013306 | A1* | 1/2006 | Kim et al. ................. 375/240.12 |
| 2006/0062302 | A1* | 3/2006 | Yin et al. .................. 375/240.16 |
| 2006/0104359 | A1* | 5/2006 | Zhou et al. ............... 375/240.16 |
| 2006/0125956 | A1* | 6/2006 | Lee ............................... 348/452 |
| 2006/0193526 | A1* | 8/2006 | Boyce et al. ................. 382/236 |
| 2006/0222075 | A1* | 10/2006 | Zhang et al. ............. 375/240.16 |
| 2006/0233250 | A1* | 10/2006 | Cha et al. ................. 375/240.12 |
| 2006/0256856 | A1* | 11/2006 | Koul et al. ............... 375/240.03 |
| 2007/0047652 | A1* | 3/2007 | Maruyama et al. ...... 375/240.16 |
| 2007/0177666 | A1* | 8/2007 | Suman et al. ............ 375/240.12 |
| 2007/0286286 | A1* | 12/2007 | Heng et al. .............. 375/240.16 |
| 2008/0013630 | A1* | 1/2008 | Li et al. .................... 375/240.16 |
| 2008/0043845 | A1* | 2/2008 | Nakaishi .................. 375/240.16 |
| 2008/0112631 | A1* | 5/2008 | Huggett et al. ............... 382/236 |
| 2008/0117976 | A1* | 5/2008 | Lu et al. ................... 375/240.16 |
| 2008/0126278 | A1* | 5/2008 | Bronstein et al. ............... 706/17 |
| 2008/0304569 | A1* | 12/2008 | Lee et al. ................. 375/240.16 |
| 2008/0310514 | A1* | 12/2008 | Osamoto et al. ......... 375/240.16 |

(Continued)

OTHER PUBLICATIONS

Information Technology—Coding of Audio-Visual Objects—Part 10: Advanced Video Coding, ISO/IEC International Standard 14496-10, Jun. 2003.

(Continued)

*Primary Examiner* — Ayaz Sheikh
*Assistant Examiner* — Peter Chau

(57) ABSTRACT

A process performs a search on a base reference frame in a video signal to determine a first motion vector for each of the possible partitions of a current macroblock. The first motion vector for a partition provides the most optimal match for the partition in the base reference frame. An optimal partition for the current macroblock, which gives a minimum motion estimation cost among all the possible partitions in the base reference frame, is determined. The process performs the search on the optimal partition over a non-base reference frame in the video signal to determine a second motion vector that provides the most optimal match for the corresponding partition in the non-base reference frame. A simplified search is performed on each partition other than the optimal partition over the non-base reference frame to determine the second motion vector for the corresponding partition.

20 Claims, 8 Drawing Sheets

| Sequences | Initialization (% of total SAD count) | Initialization complexity per reference frame | | |
|---|---|---|---|---|
| | | refIdx=0 (% of total SAD count) | refIdx=1 (% of total SAD count) | refIdx=2 (% of total SAD count) |
| Bus | 79.3 | 24.4 | 32.3 | 22.6 |
| News | 83.3 | 25.9 | 32.3 | 25.1 |
| Carphone | 80.0 | 25.6 | 30.1 | 24.3 |
| Coastguard | 74.5 | 24.1 | 27.3 | 23.1 |
| Football | 78.0 | 24.3 | 31.1 | 22.6 |
| Foreman | 76.4 | 23.2 | 31.1 | 22.1 |
| Hall Monitor | 85.3 | 27.2 | 31.5 | 26.6 |
| Miss America | 88.4 | 28.4 | 32.8 | 27.2 |
| Mobile | 77.0 | 24.1 | 29.5 | 23.4 |
| Mother Daughter | 82.4 | 26.1 | 31.4 | 24.9 |
| Stefan | 80.9 | 23.4 | 35 | 22.5 |
| Average | 80.5 | 25.2 | 31.3 | 24.0 |

100

U.S. PATENT DOCUMENTS

2009/0022228 A1* 1/2009 Wang et al. .............. 375/240.24
2011/0013695 A1* 1/2011 Endo ........................ 375/240.16

OTHER PUBLICATIONS

Zhibo Chen, Peng Zhou and Yun He, "Fast Integer Pel and Fractional Pel Motion Estimation for JVT", JVT-F017, Awaji, Island, JP, Dec. 5-13, 2002.

Xiaoquan Yi, Jun Zhang, Nam Ling, and Weijia Shang, "Improved and simplified fast motion estimation for JM", JVT-P021, Poznan, Poland, Jul. 24-29, 2005.

Gisle Bjontegaard, "Calculation of average PSNR differences between RD-curves", VCEG-M33, thirteenth meeting of ITU Telecommunications Standardization Sector Study Group 16 Question 6, Video Coding Experts Group (VCEG), Apr. 2-4, 2001.

* cited by examiner

| Sequences | Initialization (% of total SAD count) | Initialization complexity per reference frame | | |
|---|---|---|---|---|
| | | refIdx=0 (% of total SAD count) | refIdx=1 (% of total SAD count) | refIdx=2 (% of total SAD count) |
| Bus | 79.3 | 24.4 | 32.3 | 22.6 |
| News | 83.3 | 25.9 | 32.3 | 25.1 |
| Carphone | 80.0 | 25.6 | 30.1 | 24.3 |
| Coastguard | 74.5 | 24.1 | 27.3 | 23.1 |
| Football | 78.0 | 24.3 | 31.1 | 22.6 |
| Foreman | 76.4 | 23.2 | 31.1 | 22.1 |
| Hall Monitor | 85.3 | 27.2 | 31.5 | 26.6 |
| Miss America | 88.4 | 28.4 | 32.8 | 27.2 |
| Mobile | 77.0 | 24.1 | 29.5 | 23.4 |
| Mother Daughter | 82.4 | 26.1 | 31.4 | 24.9 |
| Stefan | 80.9 | 23.4 | 35 | 22.5 |
| Average | 80.5 | 25.2 | 31.3 | 24.0 |

| Sequences | Full Search | Diamond | Hexagon | Simplified Hexagon | P1_B2 | Fast ME |
|---|---|---|---|---|---|---|
| Bus | 818.8 | 38.7 | 146.6 | 86.6 | 55.1 | 45.6 |
| News | 818.8 | 24.8 | 60.0 | 32.0 | 21.3 | 12.4 |
| Carphone | 818.8 | 27.9 | 79.8 | 36.1 | 24.1 | 17.4 |
| Coastguard | 818.8 | 30.1 | 145.8 | 69.2 | 46.9 | 38.5 |
| Football | 818.8 | 47.8 | 149.8 | 97.4 | 63.7 | 52.8 |
| Foreman | 818.8 | 33.5 | 106.5 | 50.3 | 32.2 | 25.5 |
| Hall Monitor | 818.8 | 22.8 | 47.5 | 27.8 | 19.4 | 11.3 |
| Miss America | 818.8 | 22.4 | 42.9 | 22.6 | 15.1 | 11.2 |
| Mobile | 818.8 | 25.4 | 152.0 | 69.7 | 46.4 | 38.0 |
| Mother Daughter | 818.8 | 24.6 | 57.2 | 28.6 | 19.0 | 11.8 |
| Stefan | 818.8 | 33.8 | 128.4 | 72.0 | 45.2 | 38.7 |
| Average | 818.8 | 30.2 | 101.5 | 53.8 | 35.3 | 27.6 |
| Complexity savings of Fast ME | 96.6% | 8.6% | 72.8% | 48.7% | 21.8% | N/A |

*Figure 5*

METHOD AND APPARATUS FOR PROVIDING A FAST MOTION ESTIMATION PROCESS

BACKGROUND

1. Field

This disclosure generally relates to the field of video data processing. More particularly, the disclosure relates to digital video encoders.

2. General Background

Compression techniques are currently utilized to compress video signals so that the video signals may be more easily transmitted and stored. A video signal typically includes a number of frames, which each have an assortment of pixels arranged in Macroblocks ("MB"). Rather than sending an original MB, current compression technology allows for sending the residuals between the original MB and its prediction along with the associated motion vector(s) ("MV") that provide offsets to predict and reconstruct the MB at the receiving device. The current compression techniques assume that there is a certain degree of correlation between successive frames in a video signal. Accordingly, for a current MB in a current picture, the motion estimation ("ME") process conducts a search of a best MV(s) that points to a prediction MB in a reference frame that provides the closest match to the current MB. For a particular MB, sending the residuals between the MB and its best matched MB in the reference frame along with the associated MV, as opposed to the MB itself, minimizes the amount of data that is sent. However, it is very time consuming to search the best MV per MB in a real-time implementation.

Recent developments have led to a video compression standards called H.264 and MPEG-4 Advanced Video Coding ("AVC"). This standard allows for various features that differ from the previous MPEG standards. The ME process is computationally intensive in the H.264|MPEG-4 AVC standard.

As in other video coding standards, ME in H.264|MPEG-4 AVC is block-based. In other words, pixels are arranged in a block format, and all the pixels within a block are assumed to move in the same direction from frame to frame. However, the H.264|MPEG-4 AVC is much more flexible with respect to block sizes and the number of references per block as compared with other standards. For instance, the H.264|MPEG-4 AVC standard supports a number of different partition sizes per MB, e.g., partitions having dimensions of sixteen by sixteen, sixteen by eight, eight by sixteen, and eight by eight, and sub-partitions having dimensions of eight by eight, eight by four, four by eight, and four by four. The H.264|MPEG-4 AVC standard also supports multiple references per MB.

With respect to ME, the H.264|MPEG-4 AVC standard allows each MB partition and sub-macroblock ("sub-MB") partition to have its own MVs, and each MB partition to have its own reference picture. This flexibility significantly increases the ME performance, but at a cost of ME complexities. For example, to fully explore all the possible MB partitions and sub-MB partitions along with all the available references, ME may have to be performed several times over multiple references for each MB partition and sub-MB partition per MB. The H.264|MPEG-4 AVC standard reference code has implemented three ME processes: (1) full search; (2) Hexagon Search; and (3) Simplified Hexagon Search.

The full search process scans every candidate in the search window in raster or spiral order and finds the MV with the minimum cost per partition. While the full search can find the best result, it does so with the highest computational complexity out of all the ME processes.

Further, the Hexagon Search uses the hybrid and hierarchical motion search strategies, which include four steps with different search patterns: 1) Predictor selection; 2) Unsymmetrical-cross search; 3) Uneven multi-hexagon-grid search; and 4) Extended hexagon based search. The Hexagon Search generally achieves a faster speed than the full search.

The Simplified Hexagon Search further reduces the complexity of the Hexagon Search. There are two differences between Simplified Hexagon Search and Hexagon Search processes. First, the Simplified Hexagon Search uses fixed thresholds for early termination check as opposed to the variable thresholds based on sum of absolute differences ("SAD") and quantization parameter ("QP") value utilized in the Hexagon Search. Second, the Simplified Hexagon Search spends more search effort on the sixteen by sixteen partition and sets much looser thresholds for other partitions for early termination check. The Simplified Hexagon Search generally improves search speed over the Hexagon Search.

While the Simplified Hexagon Search is faster than the full scan search and the Hexagon Search, it still does not provide adequate processing time for the ME. As an H.264|MPEG-4 AVC encoder allows multiple MB partitions and sub-MB partitions, and further allows each partition and sub-partition to have a temporary predicted block from one of several previously encoded reference pictures, the H.264|MPEG-4 encoder has to perform ME several times over multiple references for each partition. The current Simplified Hexagon Search is not fast enough to accommodate ME in a real time encoder utilizing digital signal processing ("DSP").

SUMMARY

In one aspect of the disclosure, a process performs a search on a base reference frame in a video signal to determine a first motion vector for each possible partition configuration of a current MB. The first motion vector provides the most optimal match for the corresponding partition in the base reference frame. Further, the process determines an optimal partition for the current MB. The optimal partition provides a minimum ME cost among the possible partition configurations in the base reference frame. In addition, the process performs the search for the optimal partition over a non-base reference frame in the video signal to determine a second motion vector that provides the most optimal match for the corresponding partition in the non-base reference frame. Finally, the process performs a simplified search on each partition other than the optimal partition over the non-base reference frame to determine the second motion vector for the corresponding partition.

In another aspect of the disclosure, a computer program product is provided. The computer program product comprises a computer useable medium that has a computer readable program. When the computer readable program is executed on a computer, the computer is caused to perform a search on a base reference frame in a video signal to determine a first motion vector for each possible partition configuration of a current MB. The first motion vector provides the most optimal match for the corresponding partition in the base reference frame. Further, the computer is caused to determine an optimal partition for the current MB. The optimal partition provides a minimum ME cost among the possible partition configurations in the base reference frame. In addition, the computer is caused to perform the search for the optimal partition over a non-base reference frame in the video signal to determine a second motion vector that provides the most optimal match for the corresponding partition in the non-base reference frame. Finally, the computer is caused to perform a simplified search on each partition other than the optimal partition over the non-base reference frame to determine the second motion vector for the corresponding partition.

In yet another aspect, a system is disclosed. The system has a fast motion estimation module that (i) performs a search on a base reference frame in a video signal to determine a first motion vector for each possible partition configuration of a current macroblock, the first motion vector providing the most optimal match for the corresponding partition in the base reference frame, (ii) determines an optimal partition for the current macroblock, the optimal partition providing a minimum motion estimation cost among the possible partition configurations in the base reference frame, (iii) performs the search for the optimal partition over a non-base reference frame in the video signal to determine a second motion vector that provides the most optimal match for the corresponding partition in the non-base reference frame, (iv) performs a simplified search on each partition other than the optimal partition over the non-base reference frame to determine the second motion vector for the corresponding partition, and (v) provides at least one motion vector per reference frame for each possible partition.

Further, the system has a transmitter that selectively transmits a final partition for the current MB along with an associated MV and reference frame index.

Finally, the system has a receiver that receives the final partition along with the associated MV and the reference frame index.

BRIEF DESCRIPTION OF THE DRAWINGS

The above-mentioned features of the present disclosure will become more apparent with reference to the following description taken in conjunction with the accompanying drawings wherein like reference numerals denote like elements and in which:

FIG. 1 is a table that illustrates the computational complexity of the initialization task.

FIG. 5 is a table that illustrates the computational complexity of the example of the fast ME process shown in FIG. 3 and FIG. 4 as compared with other searches.

DETAILED DESCRIPTION

Figure 2:
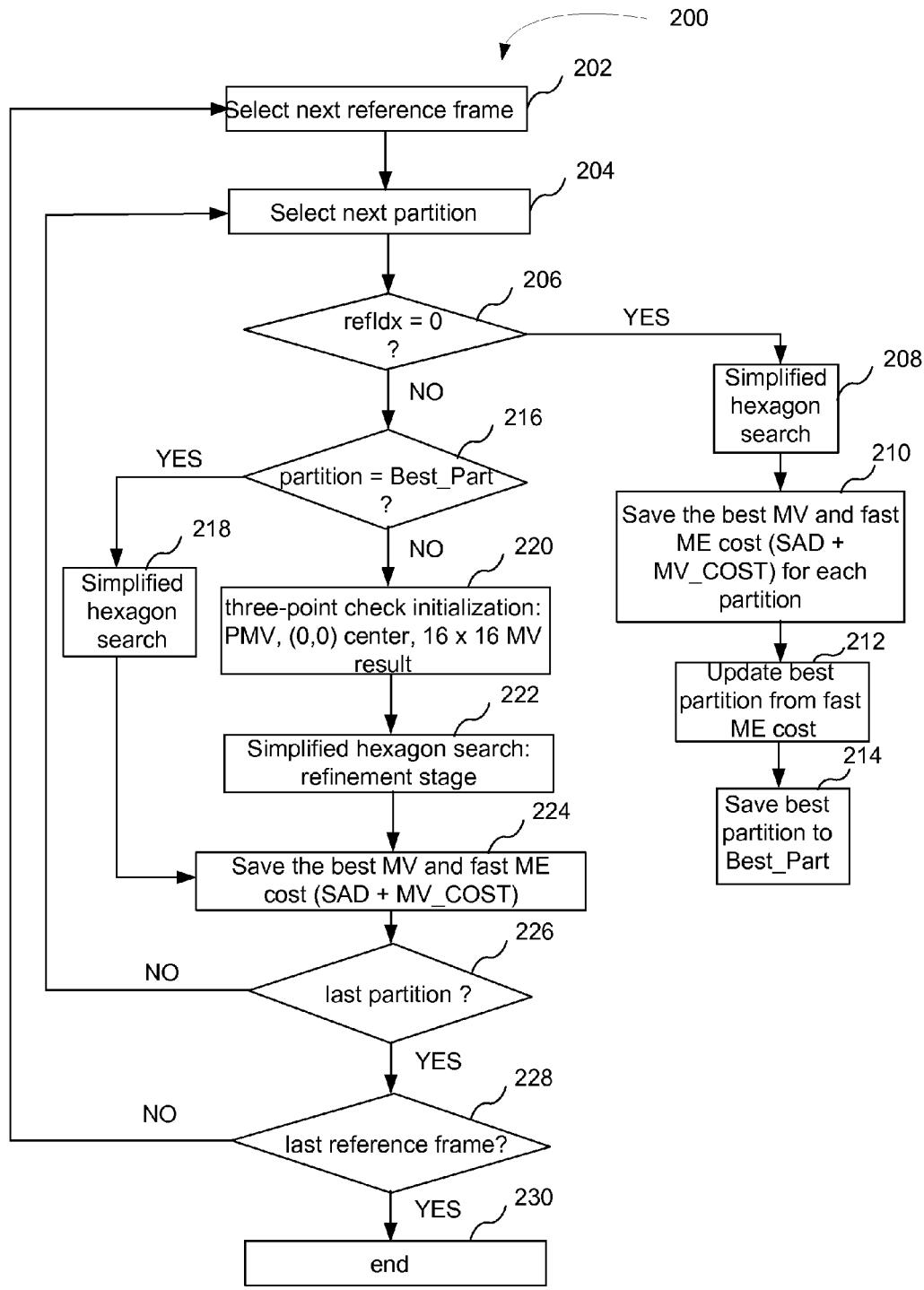
FIG. 2 illustrates a fast ME process that may be utilized to enhance ME speed and minimize performance degradation during the ME search.

A method and apparatus are disclosed that provide for a fast ME process. The fast ME process may be utilized in a real-time encoder utilizing DSP or a general purpose processor. The fast ME process is configured to provide a faster processing time than normally seen ME process such as, for example, full search and Simplified Hexagon Search. An efficient implementation of ME over multiple reference pictures helps provide the speed enhancement. Based on the search result of a base reference picture, the fast ME process predicts the partition size for one or more non-base reference pictures that may contain the best match results. The ME process for other partition sizes may then be simplified in the one or more non-base reference pictures to lessen computational demand. As a result of the search effort in the one or more non-base reference pictures being reduced, the search speed is enhanced.

In general, an ME process involves two main tasks: (1) initialization and (2) refinement. The initialization task subsamples the ME search area and localizes a good starting point for the refinement task. An example of the ME process is the Simplified Hexagon Search. First, the initialization task determines a center of a search window. Second, the initialization task performs an unsymmetrical-cross search around the center of the search window. Finally, the initialization task performs an uneven multi-hexagon-grid search. The refinement task then performs an extended hexagon-based search using the outcome of the initialization task and refines the search results according to the gradient of the local search.

FIG. 1 is a table 100 that illustrates the computational complexity of the initialization task. For example, ten test sequences at CIF ("common intermediate format") resolution are shown. In particular, the computational complexity of the initialization task is shown as a percentage of the entire ME process for the Simplified Hexagon Search. Not only is the initialization task important to the quality of the final search output, but as can be seen from the table 100, the initialization task takes up a majority of the computations in the Simplified Hexagon Search. The initialization tasks for the video sequences take on average about eighty percent of the total complexity.

The table 100 also depicts how each of the initializations is utilized per reference frame. The Simplified Hexagon Search treats each reference frame similarly. For instance, almost the same effort is allocated to the reference frame corresponding to the reference index equaling zero as the reference frame corresponding to the reference index equaling two. The reference frame corresponding to the reference index equaling one only utilizes a small amount more effort. In default, the reference frame corresponding to the reference index equaling zero is the closest to the current picture. Therefore, the reference frame corresponding to the reference index equaling zero is more correlated with the current picture because of temporal closeness. There is a good chance that the best MV is selected from the reference frame corresponding to the reference index equaling zero.

In one embodiment, unequal initialization for multiple references may be utilized to enhance ME speed without much performance degradation. In other words, more effort is spent on the initialization task on the reference frame corresponding to the reference index equaling zero.

FIG. 2 illustrates a fast ME process 200 that may be utilized to enhance ME speed and minimize performance degradation. Given a current MB in a current picture, the fast ME process 200 provides an MV per reference frame for each allowable partition. The ME process 200 implements the initialization and refinement tasks for all the allowable MB partitions and sub-MB partitions only for the reference frame corresponding to the reference index equaling zero. The fast ME process 200 then selects, based on the search results of the reference corresponding to the reference index equaling zero, the optimal partition over all possible MB partitions and sub-MB partitions, which is likely to be the final selected partition. The fast ME process 200 implements the initialization and refinement tasks for the selected optimal partition for the reference picture corresponding to the reference index not equaling zero. For all the other MB partitions and sub-MB partitions, a simplified initialization task is utilized over references corresponding to the reference indices not equaling zero. In one embodiment, the simplified initialization task checks three positions: MV(0,0), predicted motion vector ("PMV"), and MV result from the sixteen by sixteen partition.

In an ME process, as normally seen, the initialization process is repeated for each partition in each reference frame, and it is the most time consuming process. Applying an unequal initialization effort to different partitions and different reference frames can expedite the ME process. The effectiveness of the unequal initialization relies on the reference frame with the reference index equaling zero being the most important reference frame because of its closeness to the current picture and the object being best represented by the same partition size in all the reference frames.

The fast ME process 200 speeds up ME by concentrating on the optimal MB partition or sub-MB partition determined for the reference frame corresponding to the reference index equaling zero and reducing initialization tasks for all other MB partitions and sub-MB partitions in reference pictures corresponding to the reference indices not equaling zero. The optimal partition can be an MB partition or a sub-MB partition. In one embodiment, with respect to the reference frame corresponding to the reference index equaling zero, both the initialization task and the refinement task of the ME process are utilized for all the MB partitions and sub-MB partitions. Further, with respect to the other reference frames, i.e., the reference frames with reference indices greater than zero, a simplified search is applied. An example of the simplified search is a simplified initialization task and the refinement task of the ME process applied only to the optimal partition with the minimum ME cost determined when utilizing the initialization and refinement tasks for the reference frame corresponding to the reference index equaling zero. For all other partitions and sub-partitions, the initialization task is downgraded to a simplified initialization task, e.g., multi-point check initialization utilizing three-point checking, i.e., MV(0,0), PMV, and MV for sixteen by sixteen partition, and the refinement task is then performed around the best one among the three points.

Accordingly, for a given MB in a current picture, the fast ME process 200 starts at a process block 202. At a process block 204, the fast ME process 200 selects a reference frame. Further, at a process block 206, the fast ME process selects an MB partition or a sub-MB partition, e.g., sixteen by sixteen, sixteen by eight, eight by sixteen, eight by eight, eight by four, four by eight or four by four. In addition, at a decision block 208, the fast ME process 200 determines if the reference index corresponding to the selected frame equals zero.

If the reference index corresponding to the selected frame equals zero, the fast ME process 200 proceeds to a process block 210 to perform an ME search. The fast ME process 200 then proceeds to a process block 212 to save the best MV and the associated fast ME cost for the current MB partition or sub-MB partition. In one embodiment, the fast ME cost is represented by SAD+MV_COST. At a process block 214, the optimal MB partition or sub-MB partition for the given MB is updated if the selected partition has a fast ME cost that is less than the current optimal partition. Further, at a process block 216, the optimal partition is saved to a variable Best_Part. The fast ME process 200 then proceeds to a process block 228 and checks whether the current partition is the last partition for the current MB. If not, the fast ME process 200 selects a next partition for the current MB. The fast ME process 200 iterates through all of the possible partitions for a given MB over the reference frame with reference index equaling zero. After all the partitions over the reference frame with reference index equaling zero have been iterated through, the fast ME process 200 proceeds to a process block 230, which checks whether the current reference frame is the last reference frame in the reference buffer. If not, the fast ME process 200 selects a next reference frame with reference index not equaling zero and continues the ME process.

Conversely, if the reference index corresponding to the selected frame does not equal zero, the fast ME process 200 proceeds from the decision block 208 to a decision block 218. At the decision block 218, the fast ME process 200 determines if the current partition is the optimal partition. For example, the fast ME process 200 may have gone through all the possible partitions in the reference frame corresponding to the reference index equaling zero to determine that the optimal partition is eight by eight and is now analyzing the partitions in the reference frame corresponding to the reference index equaling one. If the current partition is the optimal partition, the fast ME process 200 proceeds to a process block 220 to utilize an ME search, i.e., both the initialization and refinement tasks. The fast ME process 200 then proceeds to a process block 226 to save the best MV and fast ME cost for the optimal partition. However, if the current partition is not determined to be the optimal partition at the decision block 218, the fast ME process 200 proceeds from the decision block 218 to a process block 222 to perform a simplified initialization task, e.g., a multi-point check initialization that yields a start point for the refinement task. The fast ME process 200 then proceeds to a process block 224 to perform the refinement stage of the ME search. Further, the fast ME process 200 proceeds to the process block 226 to save the best MV and fast ME cost for the current partition. In the example above, if the current partition is, for example, eight by eight for the reference frame corresponding to the reference index not equaling zero, the fast ME process 200 performs a full ME search, but if the current partition is, for example, sixteen by eight, the fast ME process performs the simplified initialization task and the refinement stage of the ME search.

At a process block 228, the fast ME process 200 checks whether the current partition is the last partition for the current MB. If not, the fast ME process 200 selects a next partition for the current MB. The fast ME process 200 iterates through all of the possible partitions for a given MB over a particular reference frame. After all the partitions over the reference frame have been iterated through, the fast ME process 200 proceeds to a process block 230, which checks whether the current reference frame is the last reference frame in the reference buffer. If not, the fast ME process 200 selects a next reference frame. After all the reference frames have been iterated through, the fast ME process 200 proceeds to a process block 232 to end the ME for the current MB.

Figure 3:
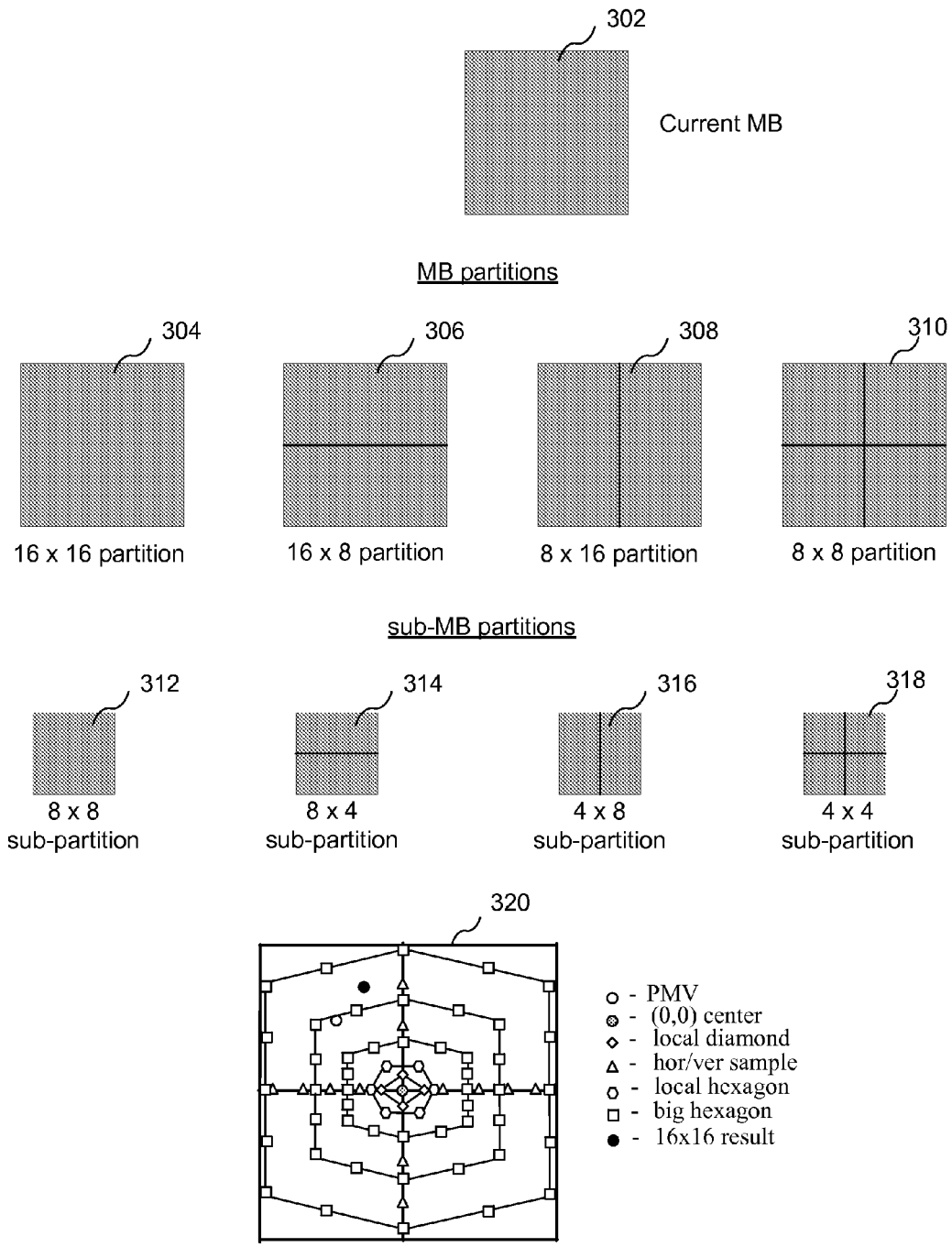
FIG. 3 illustrates an example of a fast ME search operation for a current MB performed on a reference frame, which corresponds to the reference index equaling zero.

FIG. 3 illustrates an example of a fast ME search operation performed for a MB 302 over a reference frame corresponding to the reference index equaling zero. In this example, the fast ME search operation utilizes the initialization and refinement tasks of the Simplified Hexagon Search. The MB 302 has four possible MB partition configurations according to the H.264|MPEG-4 AVC standard: a sixteen by sixteen partition 304, a sixteen by eight partition 306, an eight by sixteen partition 308, and an eight by eight partition 310. Each 8×8 block of eight by eight partition 310 has four possible sub-MB partitions: eight by eight partition 312, eight by four partition 314, four by eight partition 316, and four by four partition 318. The sixteen by sixteen partition 304 has one MV per temporal direction, the sixteen by eight partition 306 has two MVs per temporal direction, the eight by sixteen partition 308 has two MVs per temporal direction, and the eight by eight partition 310 has four MVs per temporal direction Each eight by eight sub-MB has four possible sub-MB partition configurations according to the H.264|MPEG-4 AVC standard: an eight by eight sub-partition 312, an eight by four sub-partition 314, a four by eight sub-partition 316, and a four by four sub-partition 318. The eight by eight sub-partition 312 has one MV per temporal direction, the eight by four sub-partition 314 has two MVs per temporal direction, the four by eight sub-partition 316 has two MVs per temporal direction, and the four by four sub-partition 318 has four MVs per temporal direction.

As can be seen from the search window 320, the fast ME process 200, as shown in FIG. 2, is utilized to apply both the initialization and refinement tasks to all the MB partitions and the sub-MB partitions over the closest reference frame, i.e., the reference frame corresponding to the reference index equaling zero. Accordingly, for each of the MB partition and sub-MB partitions, e.g., the sixteen by sixteen partition 304, the sixteen by eight partition 306, the eight by sixteen partition 308, the eight by eight partition 310, the eight by eight sub-partition 312, the eight by four sub-partition 314, the four by eight sub-partition 316, and the four by four sub-partition 318, ME is performed. As shown in the search window 320, the Simplified Hexagon Search utilizes a number of different search patterns, e.g., the Predictor selection, Unsymmetrical-cross search, Uneven multi-hexagon-grid search, and Extended hexagon based search. The best MV and fast ME cost for each of the MB partitions and sub-MB partitions are stored so that it may be utilized for the subsequent motion search. At the same time, the MB partition or sub-MB partition with the minimum motion cost is selected. For example, the sixteen by sixteen partition 304 may have the minimum cost.

Figure 4:
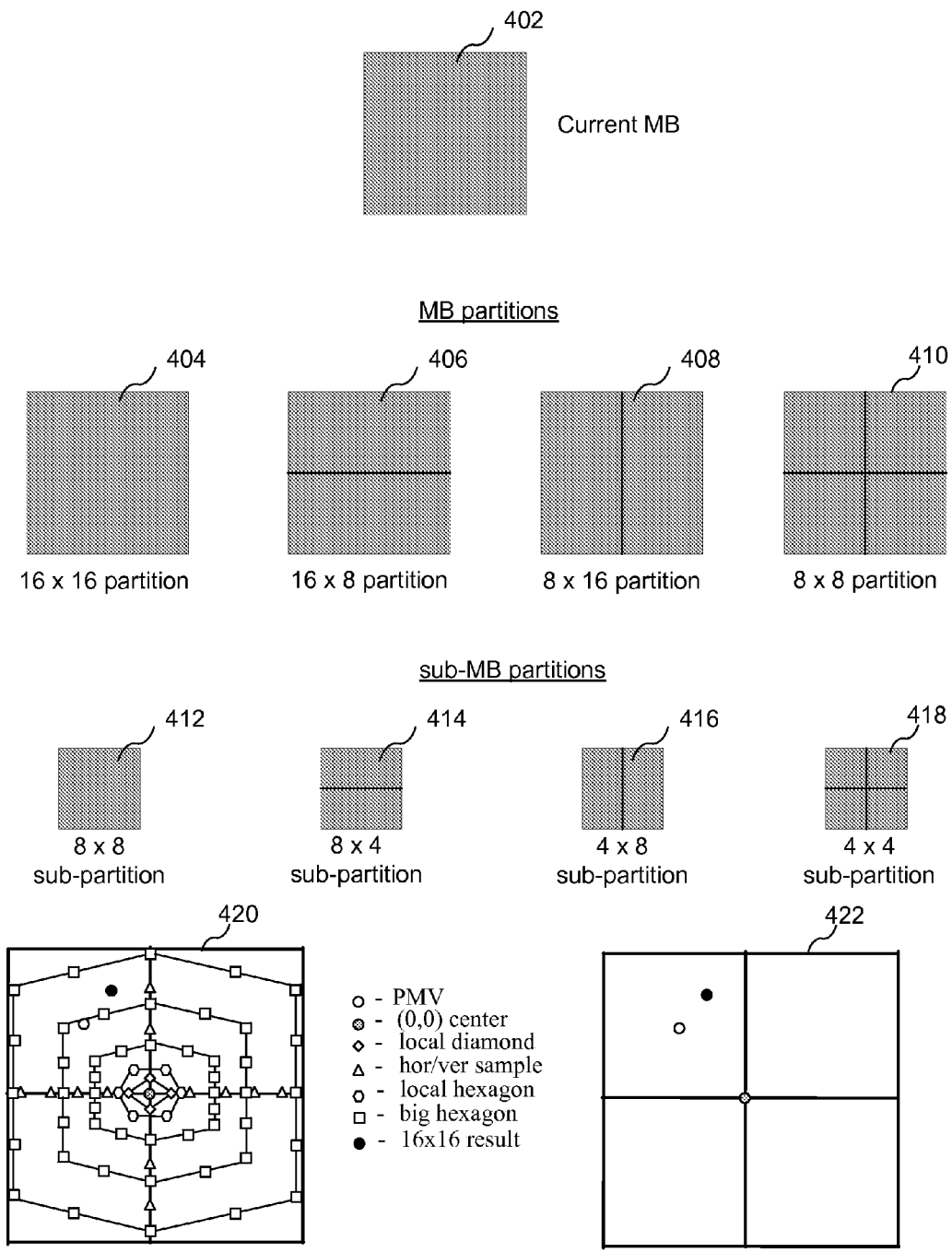
FIG. 4 illustrates an example of a fast ME search operation for a current MB performed on a reference frame, which corresponds to the reference index equaling one.

FIG. 4 illustrates an example of a fast ME search operation performed for a MB 402, over a reference frame corresponding to the reference index equaling one. The methodology described herein may be applied to any of the reference frames corresponding to a reference index greater than zero. In this example, the fast ME search operation utilizes the initialization and refinement tasks of the Simplified Hexagon Search. Similar partition configurations to that of the MB 302 seen in FIG. 3 are utilized for the MB 402, i.e., the sixteen by sixteen partition 404, the sixteen by eight partition 406, the eight by sixteen partition 408, the eight by eight partition 410, the eight by eight sub-partition 412, the eight by four sub-partition 414, the four by eight sub-partition 416, and the four by four sub-partition 418. This is based on the assumption that the sixteen by sixteen partition 304 was determined to have the minimum cost for the given MB 302 over the reference frame corresponding to the reference index equaling to zero. The full initialization procedure is performed for the sixteen by sixteen partition 404, which is followed by the refinement. Accordingly, the search window 420 illustrates the different search patterns, e.g., the Predictor selection, Unsymmetrical-cross search, Uneven multi-hexagon-grid search, and Extended hexagon based search that may be utilized in the Simplified Hexagon Search. With respect to the other possible partitions for MB 402, e.g., the sixteen by eight partition 406, the eight by sixteen partition 408, the eight by eight partition 410, the eight by eight sub-partition 412, the eight by four sub-partition 414, the four by eight sub-partition 416, and the four by four sub-partition 418, a three-point check initialization is utilized instead of the full initialization, which is followed by the refinement task of the Simplified Hexagon Search. The search window 422 illustrates the three-point check initialization, which is a less computationally intensive initialization than the full initialization as it only searches for three points: MV(0,0), PMV, and MV result from sixteen by sixteen partition. As a result, the initialization task is performed much more quickly for the sixteen by sixteen partition 406, the eight by sixteen partition 408, the eight by eight partition 410, the eight by eight sub-partition 412, the eight by four sub-partition 414, the four by eight sub-partition 416, and the four by four sub-partition 418.

FIG. 5 is a table 500 that illustrates the computational complexity of the example of the fast ME process shown in FIG. 3 and FIG. 4 as compared with other searches. The computational complexity is illustrated in terms of the number of SAD operations, along with the full search as the benchmark. Further, the Diamond Search, Hexagon Search, Simplified Hexagon Search are illustrated. All the searches utilize two reference frames per predicted picture ("P-picture") and three reference frames per bi-predicted picture ("B-picture"). The Simplified Hexagon Search with a reduced number of reference frames ("P1_B2") are also included where one reference frame is utilized to predict P-picture and two reference frames are utilized for B-picture. The fast ME process 200 utilizes the Simplified Hexagon Search with unequal initialization with two reference frames per P-picture and three reference frames per B-picture. Accordingly, the fast ME process 200 utilizes full initialization on the reference frame corresponding to the reference index equaling zero for all the possible MB partitions and sub-MB partitions, full initialization on the other reference frames for the optimal MB partition or sub-MB partition selected on the reference frame corresponding to the reference index equaling zero, and three-point check initialization on (zero center, PMV and sixteen by sixteen result) for the other MB partitions and sub-MB partitions.

As can be seen from the table 500, the fast ME process 200 has on average the least computational complexity when compared with the other ME processes. Specifically, there is an average of ninety-six and six tenths percent savings in SAD operations compared to the full search, eight and sixth tenths percent savings compared with Diamond Search, seventy-two and eight tenths percent savings compared to the Hexagon Search, forty-eight and seven tenths percent savings compared to the Simplified Hexagon Search, and twenty one and eight tenths percent savings when compared to P1_B2. The complexity reduction mainly results from the unequal initialization process for multiple reference frames.

Figure 6:
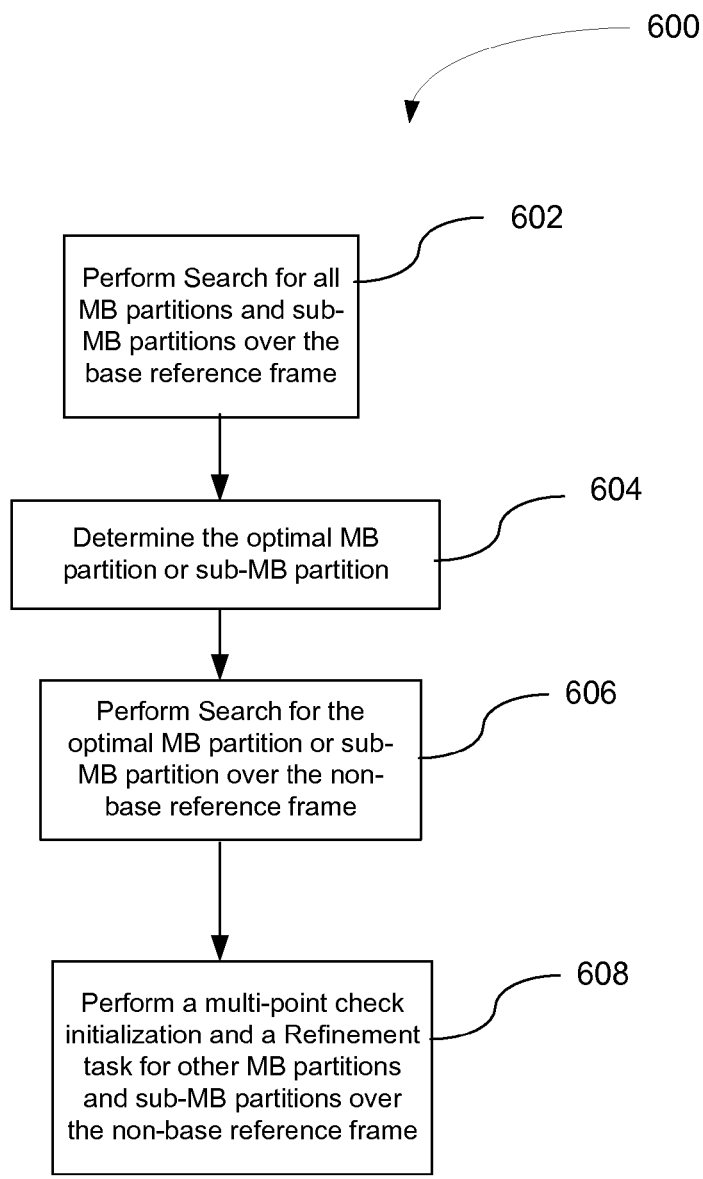
FIG. 6 illustrates a fast ME process.

FIG. 6 illustrates a fast ME process 600. Given a current MB of a current picture, the fast ME process 600 provides an MV per reference frame for each allowable partition. At a process block 602, the process 600 performs a search, e.g., a full search or a Simplified Hexagon Search, on a base reference frame. The base reference frame is in the video signal. An example of the base reference frame is the reference frame corresponding to the reference index equaling zero. At a process block 604, the process 600 determines an optimal MB partition or sub-MB partition for a current MB. Each of the possible MB and sub-MB partitions is associated with a first MV that provides the most optimal match for the corresponding partition of the current MB in the base reference frame. In addition, at a process block 606, the process 600 performs the search for the optimal MB partition or sub-MB partition over a non-base reference frame. In one embodiment, multiple non-base reference frames may be utilized. The non-base reference frame is in the video signal. The process 600 finds a second MV that provides the most optimal match for the corresponding partition of the current MB in the non-base reference frame. An example of the non-base reference frame is the reference frame corresponding to reference index equaling one. Further, at a process block 608, the ME process 600 performs a simplified search, e.g., a multi-point check initialization task that utilizes three-point check initialization and a refinement task, on MB partitions and sub-MB partitions other than the optimal partition over the non-base reference frame. Accordingly, the process 600 finds a second MV(s) for partition(s) other than the optimal partition over the non-base reference frame. In one embodiment, multiple non-base reference frames may be utilized. In one embodiment, a computer program product comprising a computer useable medium has a computer readable program that when executed on a computer causes the computer to perform the fast ME process 600.

The fast ME process 600 may utilize the same search process for the base reference and the one or more non-base reference frames. Further, the fast ME process 600 may utilize different search processes for the base reference frame and the one or more non-base reference frames. One example of such modification, Modified Full Search process, reduces total complexity of the full search process. The Modified Full Search process performs normal full search method (matching every possible search candidate inside the search window) to find the best MV of each MB partition and sub-MB partition in a current MB of a current picture in the reference corresponding to the reference index equaling zero. The best MV of each MB or sub-MB partition that gives the lowest matching cost is stored. For other reference pictures, a fast search process such as Simplified Hexagon Search is employed. Accordingly, a full initialization task may be utilized only for the MB partition or sub-MB partition with the lowest cost over the reference corresponding to the reference index equaling zero and a less complicated initialization task for the other MB partitions and sub-MB partitions. Alternatively, for other reference pictures, the full search may be utilized only for the MB partition or sub-MB partition with the lowest cost over the reference corresponding to the reference index equaling zero. A fast search process such as Simplified Hexagon Search is utilized for the other MB partitions and sub-MB partitions.

The fast ME process may be applied broadly to any ME process which utilizes a less complicated search process for non-selected MB partition and sub-MB partition in non-base reference frames. The MB partition and sub-MB partition selection process can be determined based on the matching cost of the base reference frame.

Figure 7:
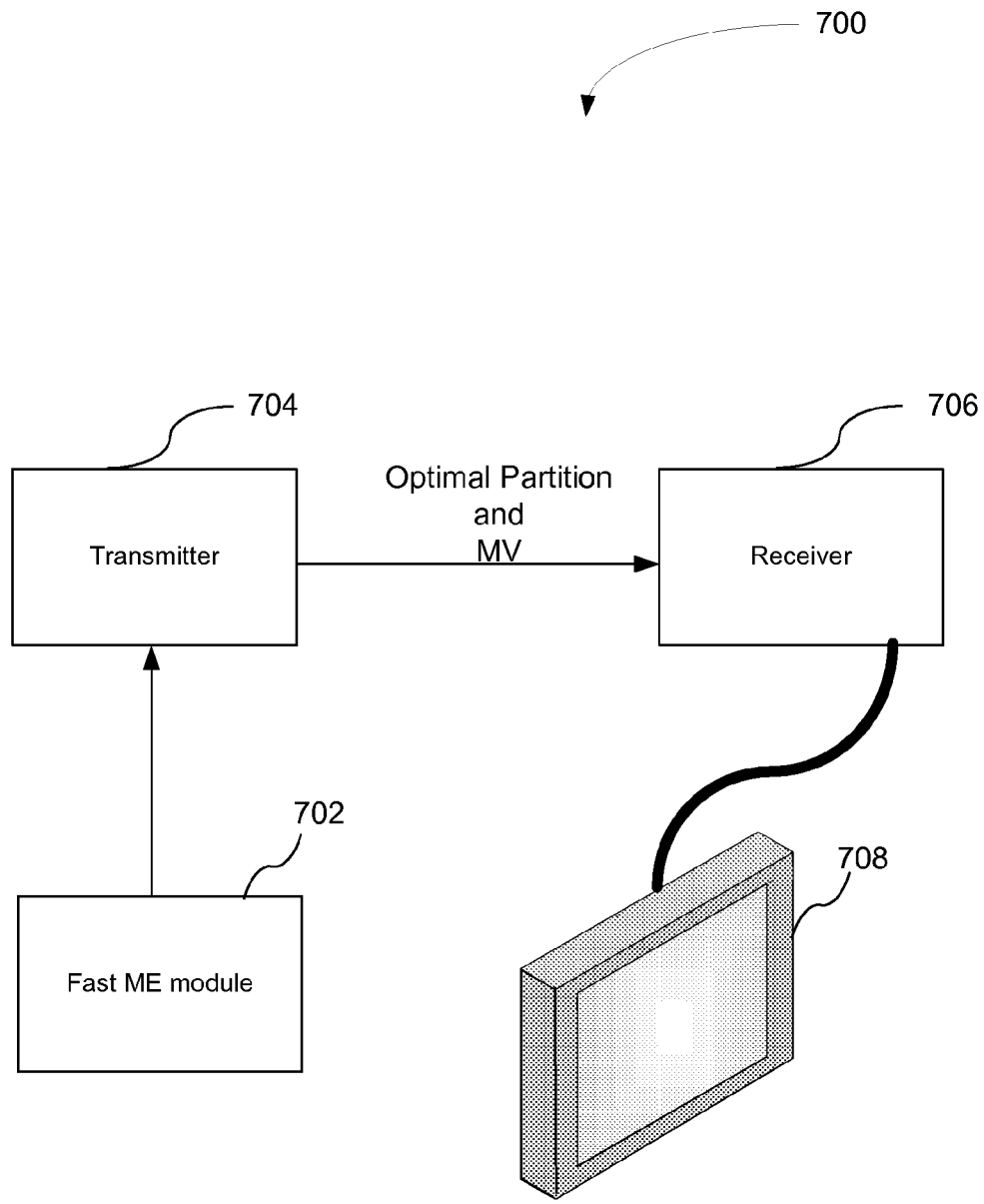
FIG. 7 illustrates a system that may be utilized to implement the fast ME process.

FIG. 7 illustrates a system 700 that may be utilized to implement the fast ME process 600. The system 700 has a fast ME module 702 that performs the fast ME process 600. Given a current MB of a current picture, the fast ME module 600 provides a MV per reference frame for each partition of the current MB. The transmitter 704 then selectively sends a final partition for the current MB along with an associated MV and reference frame index to a receiver 706. In one embodiment, the final partition is the partition with a minimum ME cost. Further, in one embodiment, the receiver 706 is operably connected to a display device 708. The receiver can utilize the final partition along with the associated MV and reference frame index to reconstruct the frame to be displayed on the display device 708. In another embodiment, the display device is integrated into the receiver 706.

Figure 8:
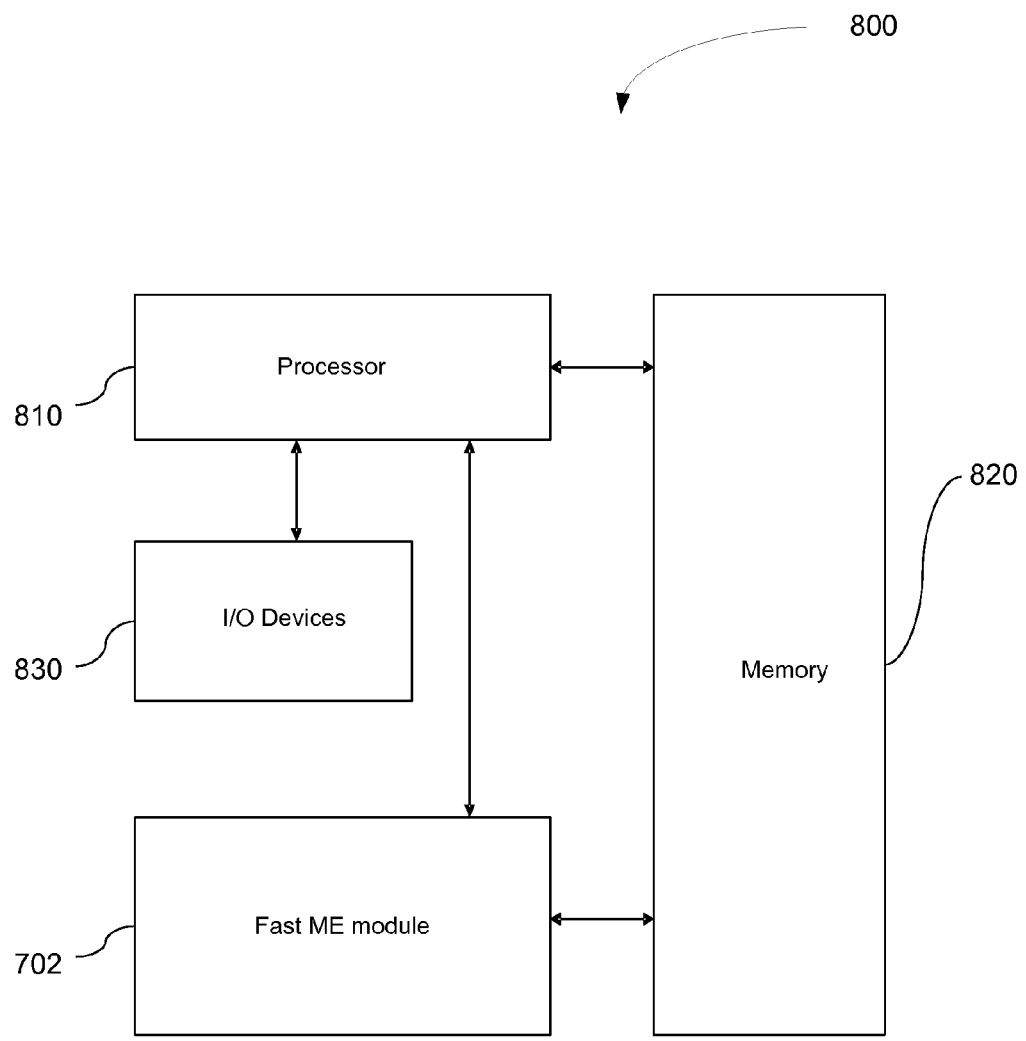
FIG. 8 illustrates a block diagram of a station or system that provides fast ME.

FIG. 8 illustrates a block diagram of a station or system 800 that provides fast ME. In one embodiment, the station or system 800 is implemented using a general purpose computer or any other hardware equivalents. Thus, the station or system 800 comprises a processor 810, a memory 820, e.g., random access memory ("RAM") and/or read only memory (ROM), the fast ME module 702, and various input/output devices 830, (e.g., e.g., audio/video outputs and audio/video inputs, storage devices, including but not limited to, a tape drive, a floppy drive, a hard disk drive or a compact disk drive, a receiver, a transmitter, a speaker, a display, an image capturing sensor, e.g., those used in a digital still camera or digital video camera, a clock, an output port, a user input device (such as a keyboard, a keypad, a mouse, and the like, or a microphone for capturing speech commands). The fast ME module 702 may include one or more processors, and/or corresponding code.

It should be understood that the fast ME module 702 may be implemented as one or more physical devices that are coupled to the processor. Alternatively, the fast ME module 702 may be represented by one or more software applications (or even a combination of software and hardware, e.g., using application specific integrated circuits (ASIC)), where the software is loaded from a storage medium, (e.g., a magnetic or optical drive or diskette) and operated by the processor in the memory 820 of the computer. As such, the fast ME module 702 (including associated data structures) of the present disclosure may be stored on a computer readable medium, e.g., RAM memory, magnetic or optical drive or diskette and the like.

It is understood that the fast ME approach described herein may also be applied in other types of systems. Those skilled in the art will appreciate that the various adaptations and modifications of the embodiments of this method and apparatus may be configured without departing from the scope and spirit of the present method and system. Therefore, it is to be understood that, within the scope of the appended claims, the present method and apparatus may be practiced other than as specifically described herein.

We claim:

1. A method comprising:
performing a search on a base reference frame in a video signal to determine a first motion vector for each of possible partition configuration of a current macroblock in the base reference frame, the first motion vector providing a most optimal match for a corresponding partition in the base reference frame;
determining an optimal partition for the current macroblock in the base reference frame, the optimal partition providing a minimum motion estimation cost among the possible partition configurations in the base reference frame;
performing a search using the optimal partition determined from the base reference frame in a non-base reference frame in the video signal to determine a second motion vector that provides a most optimal match for a partition in the non-base reference frame corresponding to the optimal partition for the base reference frame; and
performing a simplified search on each partition in the non-base reference frame other than the partition in the non-base reference frame corresponding to the optimal partition for the base reference frame to determine a second motion vector for each partition in the non-base reference frame other than the partition in the non-base reference frame corresponding to the optimal partition for the base reference frame.

2. The method of claim 1, further comprising providing, for each possible partition, at least one motion vector per reference frame.

3. The method of claim 2, further comprising selectively transmitting a final partition for the current macroblock along with a motion vector and a reference frame index.

4. The method of claim 1, wherein the search includes an initialization task and a refinement task.

5. The method of claim 1, wherein the simplified search includes a simplified initialization task and a refinement task.

6. The method of claim 5, wherein the simplified initialization task is a multi-point check initialization task that utilizes a three-point check initialization with a center point, a predicted motion vector, and a motion vector from a sixteen by sixteen partition configuration.

7. The method of claim 1, wherein the video signal is compressed according to H.264|MPEG-4 Advanced Video Coding.

8. A computer program product comprising a non-transitory computer useable medium having a computer readable program encoded thereon, wherein the computer readable program when executed on a computer causes the computer to:
   performing a search on a base reference frame in a video signal to determine a first motion vector for each of possible partition configurations of a current macroblock in the base reference frame, the first motion vector providing a most optimal match for a corresponding partition in the base reference frame;
   determining an optimal partition for the current macroblock in the base reference frame, the optimal partition providing a minimum motion estimation cost among the possible partition configurations in the base reference frame;
   performing a search using the optimal partition determined from the base reference frame in a non-base reference frame in the video signal to determine a second motion vector that provides a most optimal match for a partition in the non-base reference frame corresponding to the optimal partition for the base reference frame; and
   performing a simplified search on each partition in the non-base reference frame other than the partition in the non-base reference frame corresponding to the optimal partition for the base reference frame to determine a second motion vector for each partition in the non-base reference frame other than the partition in the non-base reference frame corresponding to the optimal partition for the base reference frame.

9. The computer program product of claim 8, wherein the computer readable program when executed on the computer further causes the computer to provide, for each possible partition, at least one motion vector per reference frame.

10. The computer program product of claim 9, wherein the computer readable program when executed on the computer further causes the computer to selectively transmit a final partition for the current macroblock along with a motion vector and a reference frame index.

11. The computer program product of claim 8, wherein the search includes an initialization task and a refinement task.

12. The computer program product of claim 8, wherein the simplified search includes a simplified initialization task and a refinement task.

13. The computer program product of claim 12, wherein the simplified initialization task is a multi-point check initialization task that utilizes a three-point check initialization with a center point, a predicted motion vector, and a motion vector from a sixteen by sixteen partition configuration.

14. The computer program product of claim 8, wherein the video signal is compressed according to H.264|MPEG-4 Advanced Video Coding.

15. A system comprising:
   a fast motion estimation module that (i) performs a search on a base reference frame in a video signal to determine a first motion vector for each of possible partition configurations of a current macroblock in the base reference frame, the first motion vector providing a most optimal match for a corresponding partition in the base reference frame, (ii) determines an optimal partition for the current macroblock in the base reference frame, the optimal partition providing a minimum motion estimation cost among the possible partition configurations in the base reference frame, (iii) performs a search using the optimal partition determined from the base reference frame in a non-base reference frame in the video signal to determine a second motion vector that provides a most optimal match for a partition in the non-base reference frame corresponding to the optimal partition for the base reference frame, (iv) performs a simplified search on each partition in the non-base reference frame other than the partition corresponding to the optimal partition for the base reference frame to determine a second motion vector for each partition in the non-base reference frame other than the partition in the non-base reference frame corresponding to optimal partition for the base reference frame, and (v) provides at least one motion vector per reference frame for each possible partition; a transmitter that selectively transmits a final partition along with an associated motion vector and reference frame index; and
   a receiver that receives the final partition for the current macroblock along with the associated motion vector and the reference frame index.

16. The system of claim 15, wherein the receiver is operably connected to a display device for display of a reconstructed video signal.

17. The system of claim 15, wherein the search includes an initialization task and a refinement task.

18. The system of claim 15, wherein the simplified search includes a simplified initialization task and a refinement task.

19. The system of claim 18, wherein the simplified initialization task is a multi-point check initialization task that utilizes a three-point check initialization with a center point, a predicted motion vector, and a motion vector from a sixteen by sixteen partition configuration.

20. The system of claim 15, wherein the video signal is compressed according to H.264|MPEG-4 Advanced Video Coding.

* * * * *